United States Patent [19]

Babcock

[11] Patent Number: 4,459,752
[45] Date of Patent: Jul. 17, 1984

[54] PRECISION TUBULAR LENGTH MEASURING SYSTEM

[75] Inventor: H. Duane Babcock, Houston, Tex.

[73] Assignee: Babcock Consultants, Inc., Houston, Tex.

[21] Appl. No.: 425,010

[22] Filed: Sep. 27, 1982

[51] Int. Cl.³ .............................................. G01B 7/04
[52] U.S. Cl. ................................... 33/134 R; 33/129;
33/132 R; 73/151.5
[58] Field of Search .................... 33/134 R, 133, 127,
33/129, 141 F, 141.5, 142, 178 F, 147 L;
73/151.5

[56] References Cited

U.S. PATENT DOCUMENTS

| | | | |
|---|---|---|---|
| 2,221,767 | 11/1940 | Hayward et al. | 33/134 R |
| 2,326,219 | 8/1943 | Hayward | 33/134 R |
| 2,327,506 | 8/1943 | Conrad et al. | 33/134 R |
| 2,623,387 | 12/1952 | Pitcher et al. | 73/151.5 |
| 2,659,046 | 11/1953 | Arps | 73/151.5 |
| 2,756,506 | 7/1956 | Scivally | 33/134 R |
| 2,860,417 | 11/1958 | Knight | 33/134 R |
| 3,364,494 | 1/1968 | Dellinger et al. | 73/151.5 |
| 3,436,954 | 4/1969 | Eppcer | 33/129 |
| 3,556,368 | 1/1971 | René33 | 129/ |
| 3,643,504 | 2/1972 | Rundell | 33/134 R |
| 3,758,954 | 9/1973 | Teplitz | 33/134 R |
| 3,853,004 | 12/1974 | Westlake et al. | 73/151.5 |
| 3,916,684 | 11/1975 | Rundell | 73/151.5 |
| 4,114,435 | 9/1978 | Patton et al. | 73/151.5 |

OTHER PUBLICATIONS

"Industrial Applications of Optical Shaft Encoders", by Edmister; from Spie, vol. 255, (1980).

*Primary Examiner*—Willis Little
*Attorney, Agent, or Firm*—Dodge & Bush

[57] ABSTRACT

Tubular length in a borehole is determined by attaching a wire or flat metallic strip to the elevator or traveling block hook of a drilling rig and accurately measuring the travel of the wire by means of a remote precision measuring wheel. The wire is maintained substantially parallel to the tubular string by causing the wire to pass around a pulley near the crown block of the drilling rig. Substantially constant tension is maintained in the wire by means of different embodiments for the invention.

The measuring wheel preferably comprises a precision wheel, the circumference of which rolls tangentially to the moving wire. The wheel drives an encoder generating electrical pulses, the count of which is proportional to the travel of the rig elevator or traveling block hook. Means are provided to count pulses only when the motion of the tubular goods are undergoing movement into or, alternatively, out of the borehole.

14 Claims, 6 Drawing Figures

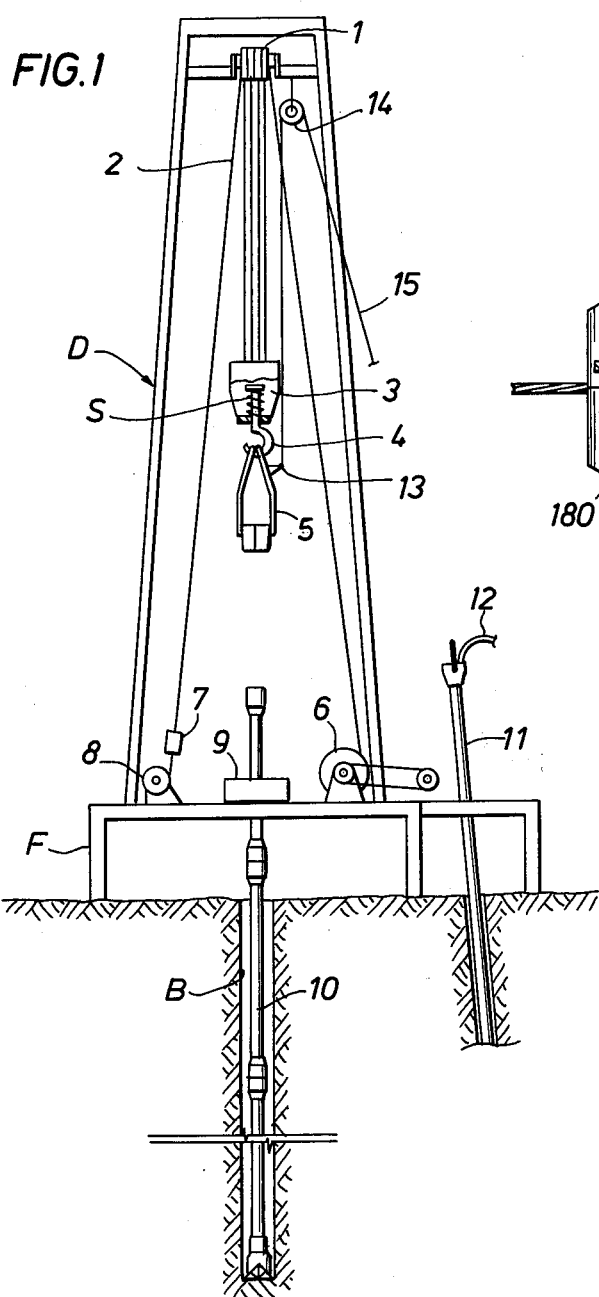
FIG.1
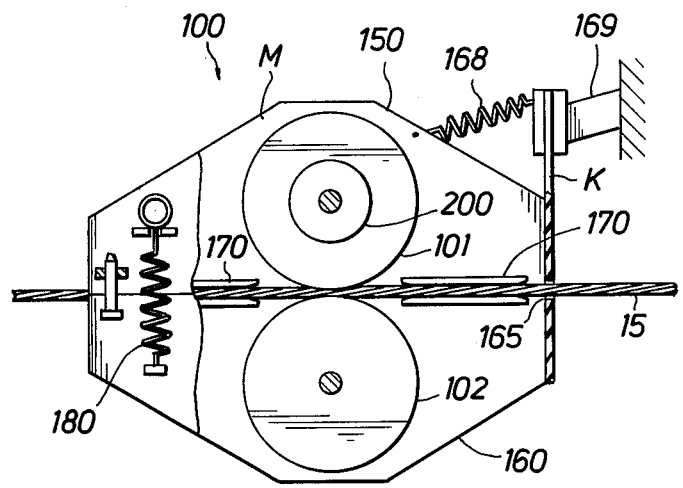
FIG.5
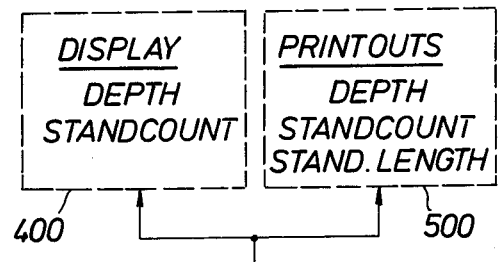
FIG.6
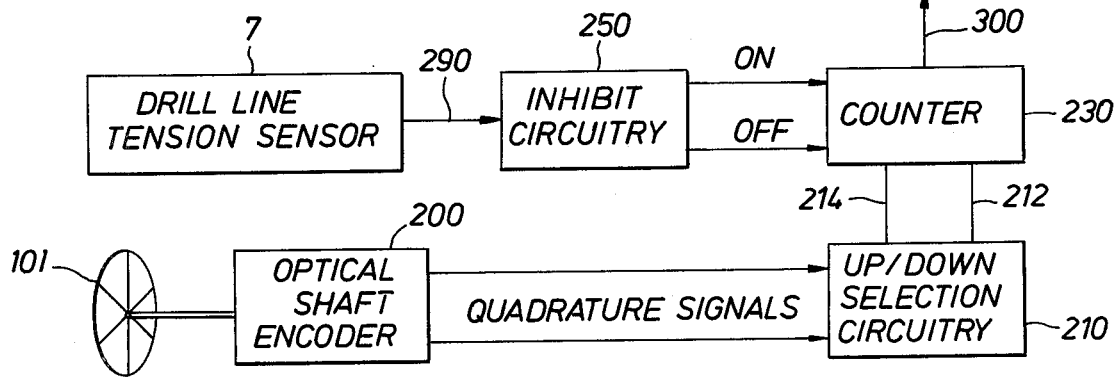
PRECISION WHEEL

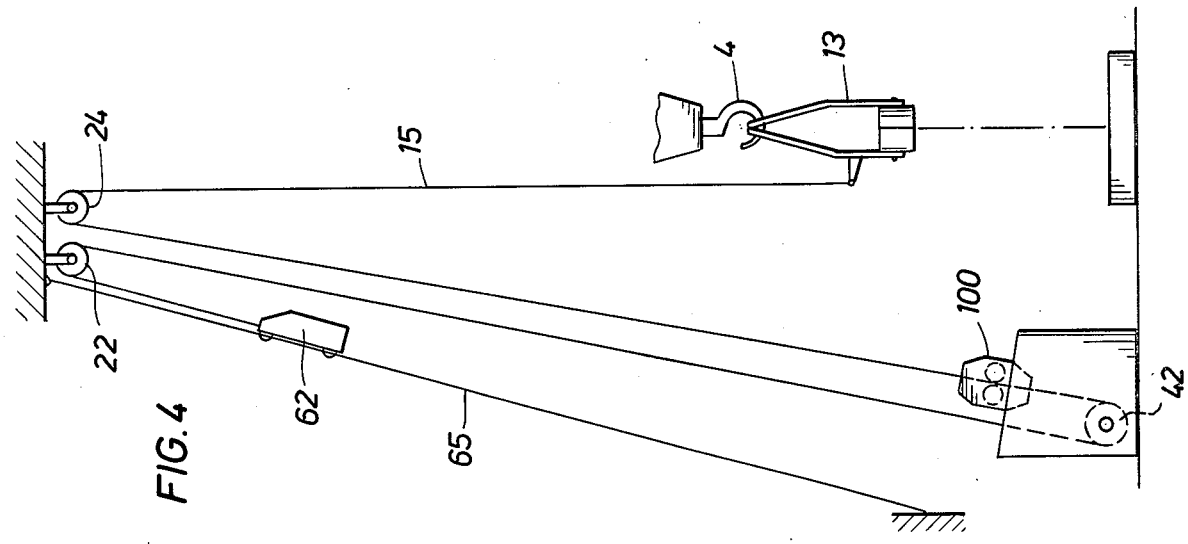
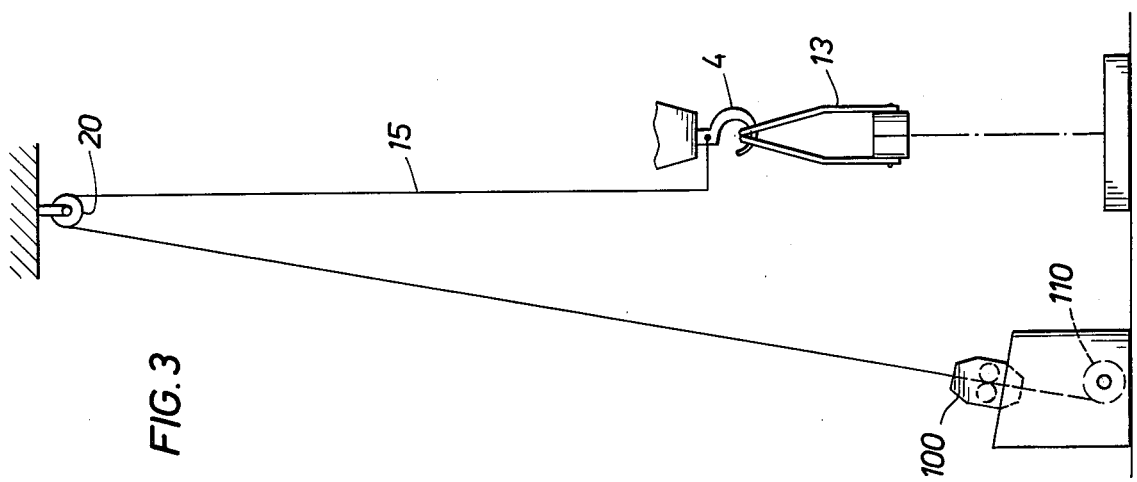
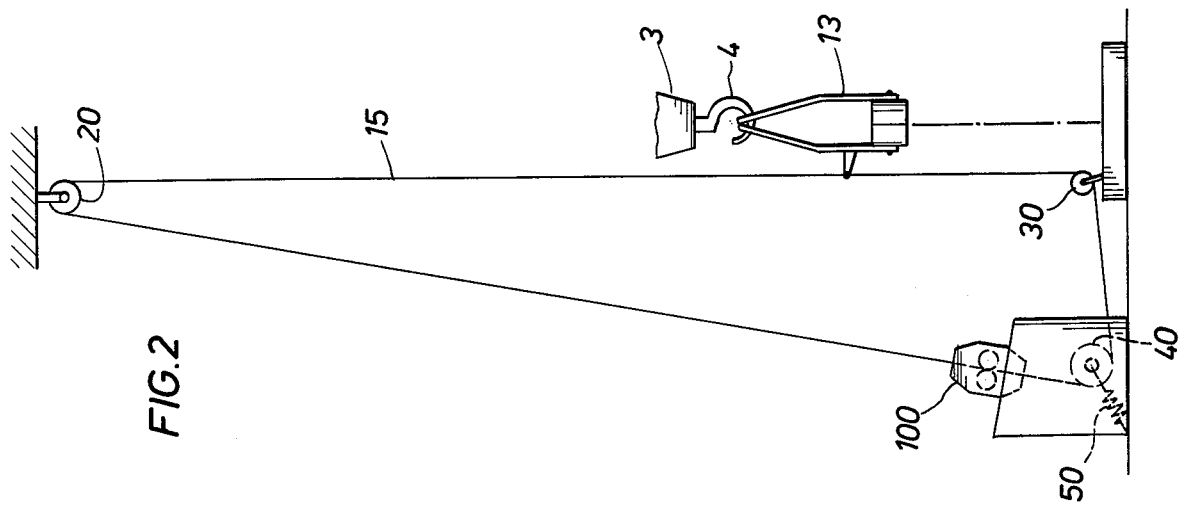

PRECISION TUBULAR LENGTH MEASURING SYSTEM

BACKGROUND OF THE INVENTION

1. Field of the Invention

This invention relates to the measurement of the length of tubular goods in a borehole and more particularly relates to apparatus for continuously and automatically monitoring the depth of tubular goods in a borehole.

2. Description of the Prior Art

In drilling for petroleum and other mineral deposits it has been the practice to monitor the depth of the borehole or the length of tubular goods in the borehole by maintaining a count of the sections of drill pipe of the drill string as they are added. Also, when casing is added to the borehole it has been the practice to verify the count by counting and measuring the sections of drill pipe as they are removed and by initially noting the distance below the surface of the uppermost section of drill pipe, thus the borehole depth can be determined.

However, the method of physically counting and measuring each drill string is time consuming and inaccurate. When the drill string is first established, the accumulated error of the sum of the lengths of the drill pipe sections of the new drill string can be sufficiently great to cause substantial uncertainty of the position of the drilling tool as it nears the bottom of the borehole. As a consequence, the new drill string when completed is lowered very slowly to prevent any damage thereof arising from the possibility of impact of the drilling tool at the bottom of the borehole. These procedures are time consuming and reflect the need for a system for automatically and continuously indicating the exact position of the drilling tool with respect to the bottom of the borehole.

Not only have the prior practices on the drilling rig site been time consuming, they have also not been accurate. Various measuring methods are commonly used on a drilling rig. Many of these methods even today involve the manually measuring of the length of tubular goods through the use of a steel measuring tape placed against the tubular member at specific points and visually reading the tape and manually recording the results. The tubular goods may be lying horizontally, they may be racked vertically in the derrick or under hanging tension during descent or ascent from the well. This physical measuring activity requires separate activity of the rig personnel, often detracting from rig time.

It is difficult to manually measure the length of most tubing and casing because there is not a shoulder make-up point that provides an absolute measuring point. It can best be measured after the joint has been torqued and the tubular goods are connected. It is generally conceded that the preferred method of measuring any tubular good is under hanging tension whereby the goods may elongate due to the force of tension. This method of measuring gives "true depth", yet the rig crew usually has no definite instruction as to how to make the measurements of the tubular goods. Rig crews usually make the measurement with the pipe racked where the pipe is under modest compression. Further, the conditions for handling and reading the tape are often poor making the measurement suspect, even though no errors are introduced in reading and recording the measurement.

There have been many prior art attempts at providing an automatic system for measuring the length of tubular goods in the borehole. For example, U.S. Pat. No. 2,623,387 shows a measuring line attached to the traveling block and looped around pulleys to a tensioning weight from a take-off pulley connected to the line. A belt drives a mechanical counter indicative of the lengths of the drilling string and the kelly in the borehole.

U.S. Pat. No. 2,221,767 discloses a measuring line running from the traveling block to a measuring reel. A clutch is provided between the reel and a counter and is engaged by means of a signal generated in the rotary table. The clutch controlling signal is generated when slips are inserted into the slip bowl of the rotary table which occurs when it is desired to add or remove sections of pipe from the well string.

U.S. Pat. Nos. 3,916,684 and 3,643,504 disclose the use of a wheel and frictional contact with the underside of one of the sheaves of the crown block to measure total depth. Pulse counter circuitry is provided to convert rotation of the wheel to depth of the well.

Other measurements and measuring systems are found in the prior art. Many of these are incremental systems for use in determining drilling rate and are not automatic or continuous measurements of the entire length of the drill pipe in the well.

Thus, there has existed a need for a precision tubular measuring system for use in drilling operations. The measurement of the length of the tubular goods in the well with precision would speed operations of lowering drill pipe to total depth made and landing casing near total depth. Placement of packers at optimum depth during tubing runs could be done with much more ease and confidence. Drilling depths for drilling records, samples and other evaluative data including geological correlation would better relate to wireline log measurements. Therefore it is an object of this invention to provide apparatus for making precision measurements with accuracy, reliability and repeatability.

SUMMARY OF THE INVENTION

Tubular length in a borehole is determined continuously and automatically by attaching a wire or a flat metallic strip (both the wire and strip hereinafter simply referred to as "wire") to the elevator or traveling block hook of a drilling rig and accurately measuring the travel of the wire by means of a remote precision measuring wheel. The wire is maintained substantially parallel to the tubular string by looping the wire to a pulley near the crown block and a pulley at or below the rig floor. The wire forms a continuous loop through the measuring wheel. Constant tension is maintained in the loop by means of a tension spring proximate one of the pulleys.

An alternative arrangement according to the invention calls for attaching the wire to the elevator or traveling block hook, then to a pulley near the crown block and thence through the precision measuring wheel to a powered take-up reel which is arranged to provide constant tension in the wire. The alternative arrangement avoids placing the pulley and wire at or near the rig floor.

Another alternative arrangement according to the invention attaches the wire to the elevator or traveling block hook to a first crown sheave thence to a precision measuring wheel located near the rig floor. Tension is maintained in the measuring wire by passing the wire through pulleys and thence to a traveling weight attached to a guy wire.

The measuring wheel preferably comprises a precision wheel, the circumference of which rolls tangentially to the moving wire. The wheel drives an encoder for generating electrical pulses, the count of which is proportional to the travel of the rig elevator or traveling block hook. Means are provided to count pulses only when the motion of the tubular goods are undergoing movement into or, alternatively, out of the borehole.

BRIEF DESCRIPTION OF THE DRAWINGS

The objects, advantages and features of the invention will be more fully understood by referring to the following description and claims taken in conjunction with the accompanying drawings wherein:

FIG. 1 is a schematic diagram of a typical drilling rig showing the measure line according to the invention attached to the traveling block lifting means;

FIGS. 2, 3 and 4 show alternative arrangements of providing a measure line according to the invention to the traveling block lifting means;

FIG. 5 illustrates the precision measuring wheel for generating electrical pulse indications of the movement of the measuring line; and FIG. 6 illustrates in block diagram form the electronics necessary for converting rotation of the precision wheel to signals representative of the depth of the tubular goods in the well.

DESCRIPTION OF THE INVENTION

Illustrated in FIG. 1 is a typical drilling rig with which the tubular measuring system according to the invention is associated. The derrick shown schematically by D is shown atop a platform or floor F above a borehole B being drilled. Atop the derrick D is a crown block 1 about which is arranged drilling line 2 which is anchored in a drill line anchor 8 and is controlled via drawworks 6. A drill line tension sensor typically is provided in the line as at 7.

Attached to the crown block is the traveling block 3 having means for lifting various tubulars and devices necessary for drilling the well. Traveling block hook 4 is illustrated holding elevators 5. Springs S connects traveling hook 4 to traveling block 3. Kelly 11 is shown separate from the traveling hook, yet when drill pipe 10 is being used to drill the borehole B, Kelly 11 is held in place by traveling hook 4 and is rotated by the rotary table 9. Kelly 11 is connected to a "mud" or drilling fluid source via a hose 12 for typical rotary drilling operations.

The measuring system according to the invention is shown partially in FIG. 1 by means of the measure line 15 being attached as at 13 to elevator 5. Alternatively, the measure line may be attached to a traveling block hook 4 according to the invention.

FIG. 2 shows one embodiment of the invention where measure line 15 is attached to elevator 13 and forms a continuous loop about crown sheave pulley 20, a pulley 30 located near the rig floor and a pulley 40 at a remote location. Tension means 50 is provided such that the remote pulley 40 creates constant tension in the loop of wire 15. Measuring device 100, discussed in more detail below, is provided away from the rig floor shown schematically near the pulley 40 in FIG. 2.

The measuring device 100 is adapted to generate electrical pulses proportional to the travel of the measuring wire 15 which passes through it. The pulses are counted and converted into a distance signal for recording or display. If the measurement is made while lowering the tubular goods into the well, any upward motion is subtracted from the count. If the measurement is made while the tubing string is raised from the borehole, any downward motion is subtracted from the count. As will be discussed below, travel of the wire 15 is only measured while the tubular is held by the traveling block hook or elevator, that is when the rig drill line is under tension, not when the traveling block 3 is disconnected from the tubular string. Controls for this feature of the invention will be discussed in more detail below. The measure wire 15 is positioned parallel to the tubular string as shown by the location of the wire running from crown sheave 20 to rig floor pulley 30. Thus, shown in the embodiment of the invention of FIG. 2 there is provided a continuous loop measuring system for measuring the tubular lengths lowered into or raised from the well.

FIG. 3 shows an alternative embodiment of the invention where the measure line 15 is secured to the elevator 13 or alternatively the hook 4. The line runs to a crown sheave pulley 20 substantially parallel to the traveling block lines or the direction of travel of the tubular goods and passes through measuring device 100 and then is taken up by a spool 110 which has associated means to maintain constant tension in the loop. Such tension controlling means may advantageously be an electrical or hydraulic motor and tension measuring means, well known in the art.

FIG. 4 shows an alternative embodiment of the invention where measure line 15 is secured to elevator 13 or alternatively traveling hook 4 in the same manner as shown in FIGS. 2 and 3 but passes over a first crown sheave 24, thence through the measuring device 100 to a remotely located pulley 42 and thence around a second crown sheave 22 for termination in a traveling weight 62 slidably attached to a guy wire. Guy wire 65 may be connected near the top of the derrick D and secured to a remote location. In this manner the desired tension in the measuring line 15 is provided by traveling weight 62.

FIG. 5 illustrates the measuring wheel device 100 according to the invention. The device requires that measure line or wire 15 pass tangentially across the edge of at least one measure wheel shown at 101 and preferably tangentially across a second wheel 102 which presses the wire 15 firmly against the radial edge of wheel 101. Because measure wheel 101 turns in proportion to the distance traveled by measure wire 15, an encoder 200 attached to the shaft of wheel 101 generates pulses proportional to the distance of travel of line 15. As shown, wheel 101 is mounted in a stationary body M while wheel 102 is stationed in hinged body N, the hinge being provided as shown at 165. The stationary body M is attached to a mounting support K and spring L is provided for tension to and alignment of the body M with respect to support K. Wire guides 170 insure that the wire 15 passes tangentially to wheels 101 and 102. Guides 170 preferably have carbide facings for engagement with wire 15 in order to prevent wear caused by the wire repeatedly sliding on the guides. Spring 180 is a tension spring for closing the hinged part of the body N to the stationary part of the body M.

The measure wheel 101 is preferably constructed of INVAR metal in order to insure a very accurate circumference having temperature stability and resistance to wear. Wheel 102 is preferably constructed of stainless steel. Encoder 200 attached to the shaft of measure wheel 101 is preferably an optical shaft encoder similar to that described in an article published by the Society of Photo-Optical Instrumentation Engineers, Vol. 255, 1980, Box 10, Bellingham, WA 98227. The preferred wire to use with this invention is a steel wire for approximately 0.082 to 0.125 inches in diameter or a flat metallic strip approximately 0.375 inches wide.

FIG. 6 illustrates that the encoder 200 driven by measure wheel 101 generates pulse signals representative of the angular rotation measure wheel 101 and the angular direction that measure wheel 101 is moving. As shown schematically in block 210 up-down selection circuitry is responsive to not only the number of pulses which have been generated by optical shaft encoder but also its angular rotation direction such that pulse counts are generated on representative line 212 while the direction of rotation signal is present on line 214. In order for the measure system to be automatic it is necessary that the counter not be advanced while the measure line 15 is moving when tubular goods are not attached to elevator 13 or to hook 4. For that reason, it is necessary to turn the counter 230 off by means of a signal froom inhibit circuitry 250 when traveling block 3 is not under tension. One way that such inhibit circuitry can be activated is by transmitting a signal to inhibit circuitry 250 from the drill line tension sensor 7 shown schematically in FIG. 1. Thus, if there is no tension in the drill line that fact is indicated by signal on lead 290 which causes inhibit circuitry to turn counter 230 off. Further movement of the traveling block and hook 4 and elevator 13 attached thereto do not advance or retard counter 230. Thus, the measure system according to the inveniton is automatic in that as the traveling block 3 moves up and down during normal operations on the rig, only those motions where tubular goods are attached thereto are measured.

FIG. 6 also shows how the output of counter 230 on line 300 may be applied to converter circuitry 350, which advantageously may be a microprocessor, for converting the counts to outputs for a recorder 400 or hard copy printer 500 for recording depth or stand count or stand length of the tubular goods in the well.

Operation

Operation of the apparatus described above is simple because of the automatic features built into its design. Setting up of the apparatus on the drilling rig merely requires placing of the pulleys, tension means and running the wire from the elevator or traveling block hook via pulleys to the measuring wheel to the tension means. Zeroing the measuring readout and attaching a lead from the load sensing means to the inhibit circuitry of the pulse counting apparatus completes the necessary set up procedures for automatic operation of the measuring apparatus.

While the invention has been described with a certain degree of particularity, it can, nevertheless be seen by the descriptions hereinabove set forth, that many modifications and variations of the invention can be made without departing from the spirit and scope of the claims which follow.

What is claimed is:

1. Apparatus for measuring the length of tubular goods in a well bore and adapted for use with a well derrick and associated equipment including a crown block, drilling line and drawworks and a traveling block having an associated lifting means such as a traveling hook or elevator, the measuring apparatus comprising, measurement wheel means having a wheel and means for generating electrical pulses indicative of the direction of angular rotation of said wheel means and to the amount of angular shaft rotation of said wheel means, a crown sheave pulley, measure wire means independent and separate from the drilling line secured to the traveling block lifting means and running about the crown sheave pulley to the measurement wheel means, the crown sheave pulley arranged so that the measure wire means secured to the traveling block lifting means is substantially parallel to the tubular goods being supported by the tubular goods supported by the traveling block lifting means, the measure wire means arranged to engage the measurement wheel means and to turn the wheel in proportion to the linear movement of said traveling block lifting means, tension means for establishing tension in the independent and separate measure wire means, sensing means for generating a tension signal when tubular load is carried by said traveling block, and counter means responsive to said electrical pulses and to said tension signal for generating a signal representative of the length of tubular goods extending within the well bore.

2. The apparatus of claim 1 wherein said measure wire means is secured to the hook of the traveling block and the length of tubular goods in the well bore includes the length of drilling string tubular members and the drilling kelly supported by said traveling block hook.

3. The apparatus of claim 1 wherein said measure wire means is secured to the elevator supported by said traveling block hook and the length of tubular goods in the well bore includes the length of casing or tubing supported by the elevator.

4. Apparatus for measuring the length of tubular goods in a well bore and adapted for use with a well derrick and associated equipment including a crown block, drilling line and drawworks and a traveling block having an associated lifting means such as a traveling hook or elevator, the measuring apparatus comprising, measurement wheel means having a wheel and means for generating electrical pulses to the amount of angular shaft rotation of said wheel means, a crown sheave pulley, measure wire means independent and separate from the drilling line secured to the traveling block lifting means and running about the crown sheave pulley to the measurement wheel means, the crown sheave pulley arranged so that the measure wire means secured to the traveling block lifting means is substantially parallel to the tubular goods being supported by the traveling block lifting means, the measure wire means arranged to engage the measurement wheel means and to turn the wheel in proportion to the linear movement of said traveling block lifting means, tension means for establishing tension in the independent and separate measure wire means, sensing means for generating a tension signal when tubular load is carried by said traveling block, counter means responsive to said electrical pulses and to said tension signal for generating a signal representative of the length of tubular goods extending within the well bore, wherein said measure wire means is a continuous loop wire about said crown sheave pulley, a pulley disposed on the rig floor and a pulley at a fixed third point, said wire extending from said secured point on said traveling block lifting means around said crown sheave pulley, thence via said measure wheel means to said pulley at the third point, thence to said rig floor pulley, and back to said secured point, said wire bearing substantially tangentially to said measure wheel means, and wherein said tension means is a spring between the axle of one of the three pulleys and a fixed point.

5. Apparatus for measuring the length of tubular goods in a well bore and adapted for use with a well derrick and associated equipment including a crown block, drilling line and drawworks and a traveling block having an associated lifting means such as a traveling hook or elevator, the measuring apparatus comprising, measurement wheel means having a wheel and means for generating electrical pulses to the amount of angular shaft rotation of said wheel means, a crown sheave pulley, measure wire means independent and separate from the drilling line secured to the traveling block lifting means and running about the crown sheave pulley to the measurement wheel means, the crown sheave pulley arranged so that the measure wire means secured to the traveling block lifting means is substantially parallel to the tubular goods being supported by the traveling block lifting means, the measure wire means arranged to engage the measurement wheel means and to turn the wheel in proportion to the linear movement of said traveling block lifting means, tension means for establishing tension in the measure wire means, sensing means for generating a tension signal when tubular load is carried by said traveling block, counter means responsive to said electrical pulses and to said tension signal for generating a signal representative of the length of tubular goods extending within the well bore, wherein said measure wire means has a wire and a spool take-up at a fixed point, said wire extending from said secured point on said traveling block lifting means around said crown sheave pulley, and then tangentially to said measure wheel means to said take-up spool, and wherein said tension means is a powered system attached to the spool take-up for maintaining tension in said wire.

6. The apparatus of claim 2, or 3 wherein said measurement wheel means comprises, first and second wheels mounted next to one another such that said wire tangentially rolls between and is pressed between the outer edges of said wheels, and said pulse generating means is an optical shaft encoder attached to one of said wheels.

7. The apparatus of claim 6 wherein said optical shaft encoder generates a first signal and second signals, the first signal indicative of the angular rotation of the shaft of said wheel and the phase difference between said first and second signals indicative of the direction of rotation of said shaft.

8. The apparatus of claim 7 wherein said counter means includes circuitry for summing said angular rotation pulses in both directions of angular rotation only when said tension signal indicates that load is carried by said traveling block.

9. The apparatus of claim 8 further comprising means for converting the output signal of said counter to a signal for recording length of tubular goods in the well.

10. Apparatus for measuring the length of tubular goods in a well bore and adapted for use with a well derrick and associated equipment including a crown block, drilling line and drawworks and a traveling block having an associated lifting means such as a traveling hook or elevator, the measuring apparatus comprising, measurement wheel means having a wheel and means for generating electrical pulses indicative of the direction of angular rotation of said wheel means and to the amount of angular shaft rotation of said wheel means, a first crown sheave pulley, measure wire means independent and separate from the drilling line secured to the traveling block lifting means and running about the crown sheave pulley to the measurement wheel means, the crown sheave pulley arranged so that the measure wire means secured to the traveling block lifting means is substantially parallel to the tubular goods being supported by the traveling block lifting means, the measure wire means arranged to engage the measurement wheel means and to turn the wheel in proportion to the linear movement of said traveling block lifting means, tension means for establishing tension in the measure wire means, sensing means for generating a tension signal when tubular load is carried by said traveling block, counter means responsive to said electrical pulses and to said tension signal for generating a signal representative of the length of tubular goods extending within the well bore, wherein said measure wire means includes a wire, a second sheave pulley near the crown block of the derrick, a pulley disposed at a third point and a guy wire attached between the derrick and a fixed point, said wire extending from said secured point on said traveling block lifting means around said first crown sheave pulley, thence to said second crown sheave pulley after passing around said pulley at the third point and tangentially to said measure wheel means, and thence to tension means including a traveling weight to said guy wire.

11. The apparatus of claim 6 wherein said measurement wheel means comprises, first and second wheels mounted next to one another such that said wire tangentially rolls between and is pressed between the outer edges of said wheels, and said pulse generating means is an optical shaft encoder attached to one of said wheels.

12. The apparatus of claim 11 wherein said optical shaft encoder generates first and second signals, the first signal indicative of the angular rotation of the shaft of said wheel and the phase difference between said first and second signals indicative of the direction of rotation of said shaft.

13. The apparatus of claim 12 wherein said counter means comprises circuitry for summing said angular rotation pulses in both directions of angular rotation only when said tension signal indicates that load is carried by said traveling block.

14. The apparatus of claim 13 further comprising means for converting the output signal of said counter to a signal for recording length of tubular goods in the well.

* * * * *